(12) United States Patent
Liu et al.

(10) Patent No.: US 9,876,679 B2
(45) Date of Patent: Jan. 23, 2018

(54) WIRELESS MESH NETWORK FIRMWARE UPGRADE SYSTEM AND METHOD

(71) Applicant: Adtran, Inc., Huntsville, AL (US)

(72) Inventors: Caiyun Liu, Burlington, MA (US); Yi Su, Bedford, MA (US); Thomas F. Guevin, Nashua, NH (US)

(73) Assignee: Adtran, Inc., Hunstville, AL (US)

( * ) Notice: Subject to any disclaimer, the term of this patent is extended or adjusted under 35 U.S.C. 154(b) by 363 days.

(21) Appl. No.: 14/484,917

(22) Filed: Sep. 12, 2014

(65) Prior Publication Data

US 2016/0080198 A1    Mar. 17, 2016

(51) Int. Cl.
*H04L 12/24* (2006.01)
*H04W 24/02* (2009.01)
*H04W 88/08* (2009.01)
*H04W 84/18* (2009.01)

(52) U.S. Cl.
CPC ........... *H04L 41/082* (2013.01); *H04W 24/02* (2013.01); *H04W 84/18* (2013.01); *H04W 88/08* (2013.01)

(58) Field of Classification Search
CPC ........... H04W 56/0005; H04W 56/001; H04W 56/0035; H04W 56/0055; H04W 56/0065
See application file for complete search history.

(56) References Cited

U.S. PATENT DOCUMENTS

| | | | |
|---|---|---|---|
| 2008/0084855 A1* | 4/2008 | Rahman | H04L 67/34 370/342 |
| 2008/0287058 A1* | 11/2008 | Nahm | G06F 8/65 455/3.02 |
| 2010/0202450 A1* | 8/2010 | Ansari | G06Q 30/04 370/389 |
| 2015/0124641 A1* | 5/2015 | MacDonald | H04W 16/00 370/254 |

* cited by examiner

*Primary Examiner* — Alvin Zhu
(74) *Attorney, Agent, or Firm* — Smith Tempel Blaha LLC; Michael J. Tempel

(57) ABSTRACT

A wireless mesh access point receives a first notification of firmware download availability. In response to the first notification, the wireless mesh access point downloads a firmware file from a peer from which the first notification was received. The wireless mesh access point loads the downloaded firmware file into a firmware memory associated with operation of a processor. The wireless mesh access point then transmits a second notification of firmware download availability to one or more other peers.

17 Claims, 3 Drawing Sheets

WIRELESS MESH NETWORK FIRMWARE UPGRADE SYSTEM AND METHOD

BACKGROUND

A wireless network is a digital communications network that allows a wireless network device to communicate with or access a computer network via a radio communication link. For a number of years, the most common type of wireless network has been that which is commonly referred to as "WiFi" or "802.11," the latter term in reference to the IEEE 802.11 set of standards that govern such networks. Such an 802.11 network comprises one or more access points (APs) that are each connected by a wired connection with a router or similar networking device. The router or other such networking device allows a client device, such as a portable computer, smartphone, etc., to communicate with or access a computer network. It is common for the networking device to provide the client device with a connection to the Internet.

A wireless mesh network is a digital communications network comprising APs organized in a mesh topology, where each AP can communicate via radio communication links in a peer-to-peer manner with other such APs in the network. Each AP can receive a message from another (peer) AP and forward or relay the message to still another (peer) AP. The message reaches its ultimate destination via one or more such relays or "hops" as they are commonly referred to in the art. In a client-server computing system, the source and destination of a message is generally a client device or a server device. Wireless mesh networks provide numerous benefits over other types of wireless networks, including redundancy. For example, if a wireless mesh AP is removed from operation in the network, it may still be possible for messages that would have been routed via that AP to reach their destinations via alternative routes. A route through the wireless mesh network between an AP and the controller via one or more hops can be referred to as an uplink. Wireless mesh networks can employ radio technology and protocols that are similar to those employed in non-mesh wireless networks, such as those governed by IEEE 802.11. A set of standards known as IEEE 802.11s relates more specifically to wireless mesh networks and is an extension of the IEEE 802.11 set of standards.

A subset of the wireless mesh APs in a network may also be wireless mesh portal APs. A wireless mesh portal AP not only can communicate via wireless communication links with peers but also can communicate via wired connections with management systems or gateways to other networks, such as the Internet.

A wireless mesh AP includes a processing system that operates under control of firmware stored in a non-volatile memory. From time to time, system administrators may wish to update the firmware of the wireless mesh APs in the network. Using a management system, the system administrator can transmit a notification to each wireless mesh AP in the network that indicates a firmware update is available for download. In response to this notification message, each wireless mesh AP initiates a process in which the firmware is downloaded from the management system to the AP memory. The firmware image or file may take multiple hops through intermediary APs before reaching the destination AP that initiated the download and that stores the firmware image in its memory. A given intermediary AP may, in some instances, relay the same firmware image multiple times in association with downloads initiated by different APs.

The above-described method by which firmware updates are performed in a wireless mesh network may be inefficient and uneconomical. For example, contention among wireless mesh APs for wireless communication link bandwidth can slow the process. Also, for example, in some instances an owner or operator of the wireless mesh network may incur a monetary cost (e.g., a bandwidth usage charge) each time a firmware image is downloaded from a source via the Internet. It would be desirable to provide firmware updates in a manner that may be more efficient and economical.

SUMMARY

Embodiments of the invention relate to a system, method, and computer program product for controlling a firmware download in a wireless mesh access point. In an illustrative or exemplary embodiment, the wireless mesh access point receives a first notification of firmware download availability. In response to the first notification, the wireless mesh access point downloads a firmware file from a peer from which the first notification was received. The wireless mesh access point loads the downloaded firmware file into a firmware memory associated with operation of a processor. The wireless mesh access point then transmits a second notification of firmware download availability to one or more other peers.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
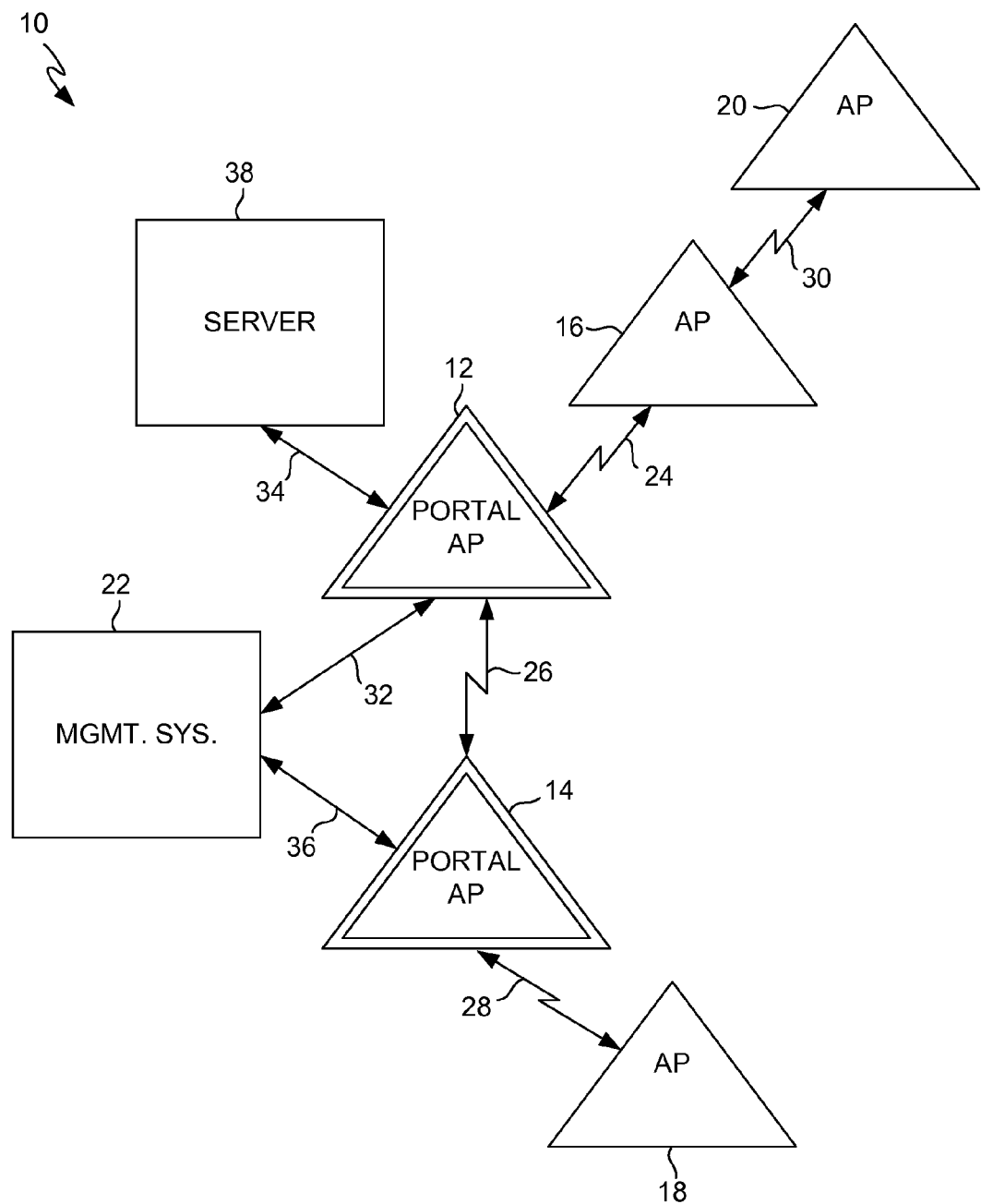
FIG. 1 is a block diagram of an exemplary wireless mesh network.

As illustrated in FIG. 1, in an illustrative or exemplary embodiment of the invention, a wireless mesh network 10 includes a plurality of wireless mesh access points (APs) 12, 14, 16, 18, 20, etc. Although for illustrative purposes only these five APs 12-20 are shown, wireless mesh network 10 can have any number of such APs. Wireless mesh network 10 further includes a management system 22. As well understood be persons skilled in the art, the exemplary APs 12-20 are arranged in a mesh topology. That is, each of APs 12-20 can communicate via a wireless communication link with at least one other of APs 12-20. Whether a particular one of APs 12-20 can establish a wireless communication link with another particular one other of APs 12-20 depends upon whether they are within radio reception range of each other and how they are configured. The spatial arrangement of APs 12-20 shown in FIG. 1 is intended merely to be illustrative, as each of APs 12-20 can be located in any suitable position relative to the others. Those of APs 12-20 that can establish wireless communication links with each other are referred to as peers. For example: AP 12 and AP 16 are peers because they can establish and communicate with each other via a wireless communication link 24; AP 12 and AP 14 are peers because they can establish and communicate with each other via a wireless communication link 26; AP 14 and AP 18 are peers because they can establish and communicate with each other via a wireless communication link 28; and AP 16 and AP 20 are peers because they can establish and communicate with each other via a wireless communication link 30. As the manner in which APs 12-20 can establish and communicate with each other such wireless communication links 24-30 is well understood by persons skilled in the art, this aspect is not described herein. Similarly, as the manner in which each of APs 12-20 can receive a message from a peer (i.e., another one of APs 12-20) and relay or forward the message to another peer is well understood by persons skilled in the art, this aspect is not described herein.

While APs 12-20 can only communicate with each other via wireless communication links 24-30, AP 12 can also communicate via wired communication links 32 and 34 because it is a wireless mesh portal AP. Similarly, AP 14 is a wireless mesh portal AP because it can communicate via a wired communication link 36. In the exemplary embodiment, wired communication link 34 connects AP 12 with a server 38, and wired communication links 32 and 36 connect AP 12 and AP 14, respectively, with management system 22.

Figure 2:
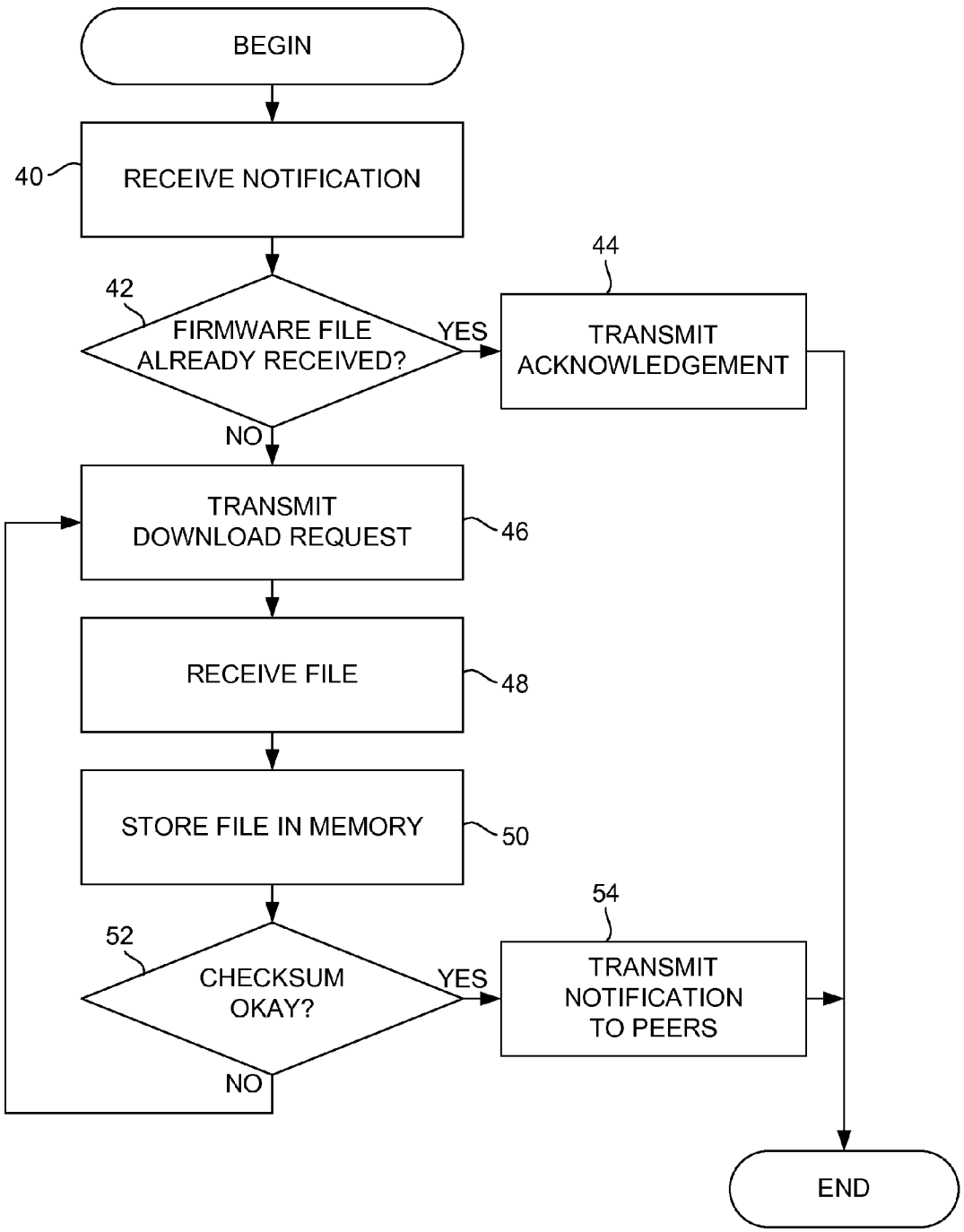
FIG. 2 is a flow diagram illustrating an exemplary method of operation of an exemplary wireless mesh access point in the wireless mesh network of FIG. 1.

The flow diagram of FIG. 2 illustrates an exemplary method by which each of APs 12-20 can operate in network 10. In the exemplary embodiment, the method occurs first at a wireless mesh portal AP and propagates to APs that are not wireless mesh portal APs. Thus, in the exemplary wireless mesh network 10 of FIG. 1 the method would first occur in AP 12 or 14. Nevertheless, for purposes of generality, the method is described below with regard to an "exemplary AP" 60 (described in further detail below with regard to FIG. 3), which can be any of APs 12-20 or any other such AP.

As indicated by block 40, the exemplary AP 60 receives a message or notification indicating that a firmware image or file is available to download. The source of this notification can be, for example, a peer or a management system. As indicated by block 42, in response to this notification, the exemplary AP 60 determines whether it has already received the firmware file (from, for example, a different peer). If the exemplary AP 60 determines (block 42) that it has already received the firmware file, the exemplary AP 60 transmits an acknowledgement message to the source of the notification, as indicated by block 44. If the exemplary AP 60 has already received the firmware file, the exemplary AP 60 does not download it again. If the exemplary AP 60 determines (block 42) that it has not yet received the firmware file, the exemplary AP 60 transmits a download request to the source of the notification, as indicated by block 46.

As indicated by block 48, following the download request, the exemplary AP 60 receives the firmware file from the source of the notification. As indicated by block 50, the exemplary AP 60 stores the received firmware file, i.e., as firmware.

As indicated by block 52, the exemplary AP 60 computes a checksum from the received firmware file. An example of a suitable checksum computation is MD5. As well understood in the art, a unique checksum can be computed for each unique firmware file. The above-described notification can include an MD5 or other suitable checksum value as well as an indication of the file size. If the computed checksum matches the checksum value that was included in the notification message, it can be concluded that the exemplary AP 60 accurately or correctly received the firmware file, i.e., without errors.

If the exemplary AP 60 determines (block 52) that it correctly received the firmware file, then the exemplary AP 60 transmits another notification similar to the above-described notification to one or more of its peers, as indicated by block 54. That is, the exemplary AP 60 that downloaded the firmware file is the source of this second notification. In response to receiving this second notification, another AP can then download the firmware file in the same manner as described above.

The above-described method of operation can be further described with regard to the following example and wireless mesh network 10 (FIG. 1). In this example, AP 12 receives a first notification from management system 22 indicating that a firmware download is available. In response to this notification, AP 12 determines that it has not yet received this firmware download. Accordingly, AP 12 transmits a download request to management system 22. AP 12 then downloads or receives the firmware file from server 38 and stores the received firmware file. Although in the exemplary embodiment the firmware file is downloaded from server 38, in other embodiments the firmware file can be downloaded from management system 22. AP 12 then computes the checksum. If the checksum indicates that the download occurred without error, then AP 12 transmits to its peers a second notification indicating that a firmware download is available. Note that the second notification is similar to the first notification. As APs 14 and 16 are peers of AP 12, each of AP 14 and 16 can then operate in the same manner described above with regard to AP 12 to download the firmware file from AP 12. After AP 16 has successfully completed downloading the firmware file from AP 12, AP 16 transmits a second notification to its peer AP 20. In turn, AP 20 can download the firmware file from AP 16. Similarly, after AP 14 has successfully completed downloading the firmware file from AP 12, AP 18 can download the firmware file from AP 14.

It should be understood that the method described above is not intended to represent the entirety of the operation of each of APs 12-20, network 10 or any portion thereof. Rather, the method described above represents only those operational aspects that are most directly related to the exemplary embodiment of the invention. Other operational aspects of each of APs 12-20, such as those that are conventional, may not be described herein, as they are well understood by persons skilled in the art. Except as otherwise stated herein, each of APs 12-20 operates not only in the manner described above but also in a conventional manner. Thus, for example, each of APs 12-20 is configured to establish and communicate via wireless communication links with client devices (not shown). Also, each of APs 12-20 is configured to relay messages along a route through network 10 between a client device and server 38 or another server (not shown). It should also be noted that although not shown for purposes of clarity, network 10 can be connected to other networks, such as the Internet. Wired communication link 34 can represent a connection to the Internet or other network.

Figure 3:
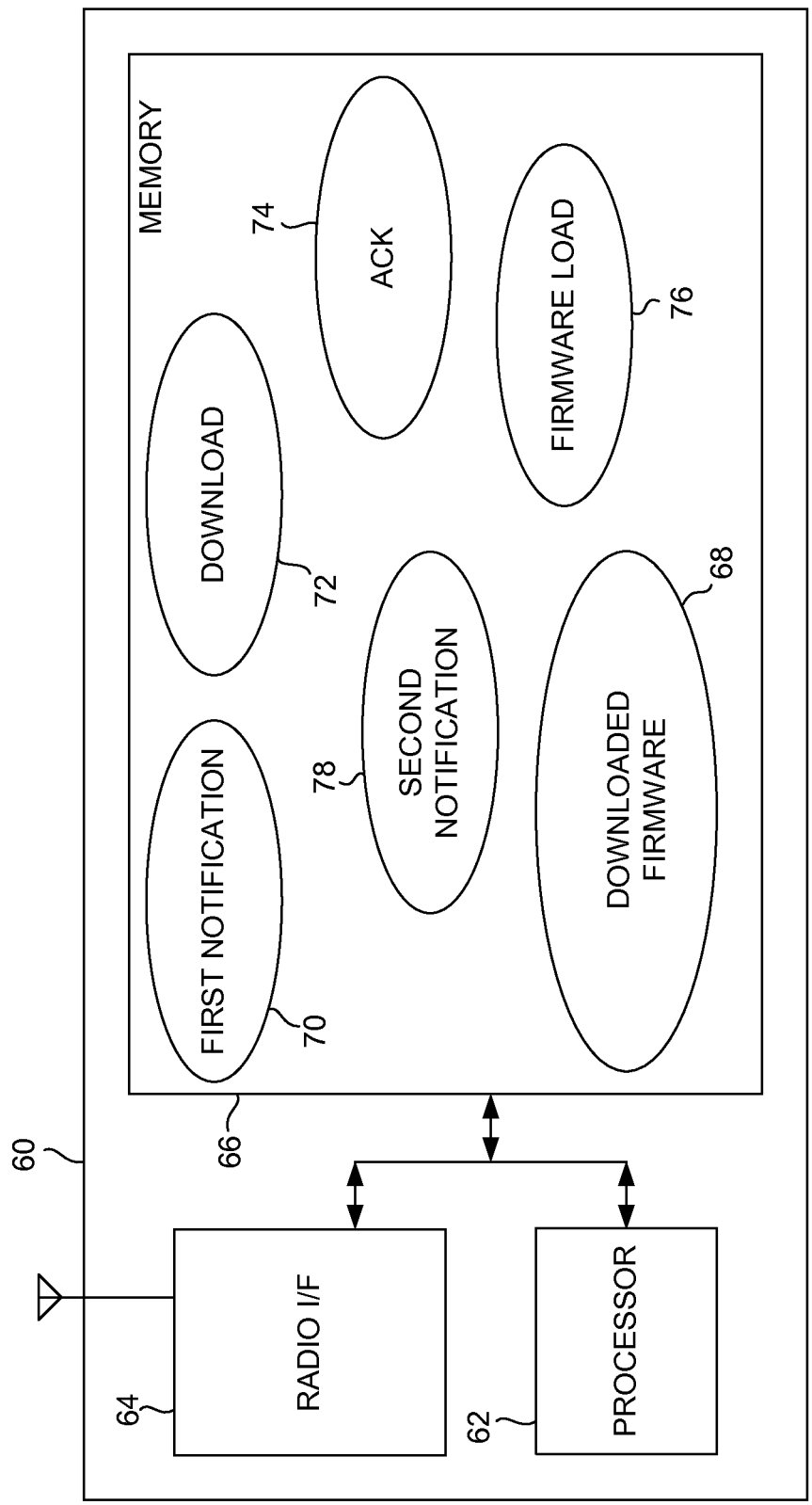
FIG. 3 is a block diagram of an exemplary wireless mesh access point of the wireless mesh network of FIG. 1.

As illustrated in FIG. 3, an exemplary AP 60, which can be, for example, any of APs 12-20 can include a processor 62, a radio interface 64, and a memory 66. In addition to these elements, AP 60 can include any other suitable elements commonly included in conventional wireless mesh access points. However, as the above-referenced elements are most directly related to the operation of the exemplary embodiment of the invention, only these elements are shown and described herein for purposes of clarity. Conventional elements, including some conventional logic, of AP 60 are not shown or described herein, as they are well understood by persons skilled in the art. As well understood in the art, radio interface 64, under control of processor 62, is configured to establish the above-referenced wireless communication links.

The above-described downloaded firmware 68 is stored in memory 66. However, AP 60 can include additional firmware, such as firmware that is not downloaded in accordance with the method described above but rather firmware that causes processor 62 to effectuate the method described above with regard to FIG. 2. Accordingly, AP 60 includes the following logic elements: first notification logic 70, download logic 72, acknowledgement logic 74, firmware load logic 76, and second notification logic 78. Downloaded firmware 68 is depicted as a separate or distinct element from logic elements 70-78 for purposes of clarity, but all are types of firmware are similar in that processor 62 operates under the control of such firmware. Indeed, some portions of logic elements 70-78 could be downloaded in accordance with the method described above, but the distinction is made in FIG. 3 for purposes of clarity.

Although the foregoing logic elements are shown in FIG. 3 in a conceptual manner as stored in or residing in memory 66, persons skilled in the art understand that such logic elements arise through the operation of processor 62. Such software or firmware contributes to programming or configuring the processing system, comprising processor 62 and memory 66, with such logic elements. Although memory 66 is depicted as a single or unitary element, memory 66 can be of any suitable type and can have any suitable structure, such as one or more modules, chips, etc. Memory 66 can be of a suitable non-volatile type, such as flash memory.

It should be understood that the combination of memory 66 and the above-referenced logic elements or software, firmware, instructions, etc., underlying the logic elements, as stored in memory 66 in non-transitory computer-readable form, defines a "computer program product" as that term is understood in the patent lexicon. In view of the descriptions herein, persons skilled in the art will readily be capable of providing suitable software or firmware or otherwise configuring AP 60 to operate in the manner described. Also, although the effect of each of the above-referenced logic elements is described herein, it should be understood that the effect may result from contributions of two or more logic elements, or from contributions of the logic elements and conventional wireless mesh access point logic elements or other network features that are not shown for purposes of clarity.

First notification logic 70 contributes to the configuring of AP 60 to wirelessly receive a first notification of firmware download availability from a peer, management system, or other source. Download logic 72 contributes to the configuring of AP 60 to wirelessly download a firmware file from a peer, management system, or other source in response to the first notification, including transmitting a download request and receiving the firmware file. Firmware load logic 76 contributes to the configuring of AP 60 to load the firmware file into memory 66. Second notification logic 78 contributes to the configuring of AP 60 to wirelessly transmit a second notification of firmware download availability to one or more peers. Acknowledgement logic 74 contributes to the configuring of AP 60 to determine if the firmware file has already been received and, if so, to transmit an acknowledgement.

One or more illustrative or exemplary embodiments of the invention have been described above. However, it is to be understood that the invention is defined by the appended claims and is not limited to the specific embodiments described.

What is claimed is:

1. A method for operation of a plurality of wireless mesh access points (APs) in a wireless mesh network, comprising:
    wirelessly receiving, by a second wireless mesh AP in the wireless mesh network from a first wireless mesh AP in the wireless mesh network, a first notification of availability of downloadable firmware stored in a firmware memory of the first wireless mesh AP;
    wirelessly transmitting, by the second wireless mesh AP, a first download request to the first wireless mesh AP based on the first notification;
    wirelessly downloading, by the second wireless mesh AP, a firmware file from the firmware memory of the first wireless mesh AP based on the first download request;
    loading, by the second wireless mesh AP, the firmware file into a firmware memory of the second wireless mesh AP; and
    wirelessly transmitting, by the second wireless mesh AP to at least a third wireless mesh AP in the wireless mesh network, a second notification of availability of downloadable firmware stored in the firmware memory of the second wireless mesh AP;
    wirelessly receiving, by a third wireless mesh AP in the wireless mesh network, the second notification from the second wireless mesh AP;
    wirelessly transmitting, by the third wireless mesh AP, a second download request to the second wireless mesh AP based on the second notification;
    wirelessly downloading, by the third wireless mesh AP, the firmware file from the firmware memory of the second wireless mesh AP based on the second download request;
    loading, by the third wireless mesh AP, the firmware file into a firmware memory of the third wireless mesh AP; and
    wirelessly transmitting, by the third wireless mesh AP to one or more other wireless mesh APs in the wireless mesh network, a third notification of availability of downloadable firmware stored in the firmware memory of the third wireless mesh AP.

2. The method of claim 1, further comprising:
    in response to the first notification, the second wireless mesh AP determining if the firmware file has already been received; and
    in response to a determination that the firmware file has already been received, transmitting an acknowledgement to the first wireless mesh AP.

3. The method of claim 1, wherein the second wireless mesh AP has only a wireless communication link with the wireless mesh network.

4. The method of claim 1, wherein:
    the first wireless mesh AP is a mesh portal having a wired communication link with a management system; and
    the first wireless mesh AP receives the first notification of firmware download availability from the management system via the wired communication link.

5. The method of claim 1, wherein the first notification is a secure message.

6. The method of claim 1, wherein the first notification includes a file size of the firmware file.

7. The method of claim 1, wherein the first notification includes a checksum uniquely associated with the firmware file.

8. A plurality of wireless mesh access points (APs), comprising:
- a first wireless mesh AP, comprising:
- a first wireless mesh AP radio interface configured to provide wireless communication in a wireless mesh network; and
- a first processing system comprising a firmware memory and a processor, the first processing system configured to include first AP first notification logic, first AP second notification logic, first AP download logic, and first AP firmware load logic;
- a second wireless mesh AP, comprising:
- a second wireless mesh AP radio interface configured to provide wireless communication in the wireless mesh network; and
- a second processing system comprising a firmware memory and a processor, the second processing system configured to include second AP first notification logic, second AP second notification logic, second AP download logic, and second AP firmware load logic; and
- a third wireless mesh AP, comprising:
- a third wireless mesh AP radio interface configured to provide wireless communication in the wireless mesh network; and
- a third processing system comprising a firmware memory and a processor, the third processing system configured to include third AP first notification logic, third AP second notification logic, third AP download logic, and third AP firmware load logic;
- wherein the second AP first notification logic is configured to wirelessly receive from the first wireless mesh AP a first notification of availability of downloadable firmware stored in the firmware memory of the first wireless mesh AP;
- wherein the second AP download logic is configured to, in response to the first notification, wirelessly transmit a first download request to the first wireless mesh AP based on the first notification and, based on the first download request, wirelessly download a firmware file from the firmware memory of the first wireless mesh AP;
- wherein the second AP firmware load logic is configured to load the firmware file into the firmware memory of the second wireless mesh AP; and
- wherein the second AP second notification logic is configured to wirelessly transmit to at least the third wireless mesh AP a second notification of availability of downloadable firmware stored in the firmware memory of the second wireless mesh AP;
- wherein the third AP first notification logic is configured to wirelessly receive the second notification from the second wireless mesh AP;
- wherein the third AP download logic is configured to, in response to the second notification, wirelessly transmit a second download request to the second wireless mesh AP based on the second notification and, based on the second download request, wirelessly download the firmware file from the firmware memory of the second wireless mesh AP;
- wherein the third AP firmware load logic is configured to load the firmware file into the firmware memory of the third wireless mesh AP; and
- wherein the third AP second notification logic is configured to wirelessly transmit to one or more other wireless mesh APs in the wireless mesh network a third notification of availability of downloadable firmware stored in the firmware memory of the third wireless mesh AP.

9. The plurality of wireless mesh APs of claim 8, wherein the second processing system is further configured to include acknowledgement logic configured to, in response to the first notification, determine if the firmware file has already been received and transmit an acknowledgement to the first wireless mesh AP in response to a determination that the firmware file has already been received.

10. The plurality of wireless mesh APs of claim 8, wherein the second wireless mesh AP has only a wireless communication link with the wireless mesh network.

11. The plurality of wireless mesh APs of claim 8, wherein:
- the first wireless mesh AP is a mesh portal having a wired communication link with a management system; and
- the first wireless mesh AP receives the first notification of firmware download availability from the management system via the wired communication link.

12. The plurality of wireless mesh APs of claim 8, wherein the first notification is a secure message.

13. The plurality of wireless mesh APs of claim 8, wherein the first notification includes a file size of the firmware file.

14. The plurality of wireless mesh APs of claim 8, wherein the first notification includes a checksum uniquely associated with the firmware file.

15. A computer program product for controlling a firmware download to a plurality of wireless mesh access points (APs) in a wireless mesh network, the computer program product comprising one or more computer-readable media having stored thereon in non-transitory computer-readable form instructions that when executed by a processing system of wireless mesh APs causes the wireless mesh APs to effectuate a method comprising:
- wirelessly receiving, by a second wireless mesh AP in the wireless mesh network from a first wireless mesh AP in the wireless mesh network, a first notification of availability of downloadable firmware stored in a firmware memory of the first wireless mesh AP;
- wirelessly transmitting, by the second wireless mesh AP, a first download request to the first wireless mesh AP based on the first notification;
- wirelessly downloading, by the second wireless mesh AP, a firmware file from the firmware memory of the first wireless mesh AP based on the first download request;
- loading, by the second wireless mesh AP, the firmware file into a firmware memory of the second wireless mesh AP; and
- wirelessly transmitting, by the second wireless mesh AP to at least a third wireless mesh AP in the wireless mesh network, a second notification of availability of downloadable firmware stored in the firmware memory of the second wireless mesh AP;
- wirelessly receiving, by a third wireless mesh AP in the wireless mesh network, the second notification from the second wireless mesh AP;
- wirelessly transmitting, by the third wireless mesh AP, a second download request to the second wireless mesh AP based on the second notification;

wirelessly downloading, by the third wireless mesh AP, the firmware file from the firmware memory of the second wireless mesh AP based on the second download request;

loading, by the third wireless mesh AP, the firmware file into a firmware memory of the third wireless mesh AP; and wirelessly transmitting, by the third wireless mesh AP to one or more other wireless mesh APs in the wireless mesh network, a third notification of availability of downloadable firmware stored in the firmware memory of the third wireless mesh AP.

16. The computer program product of claim 15, further comprising instructions that when executed by the processing system cause the plurality of wireless mesh APs to effectuate the method further comprising:

in response to the first notification, the second wireless mesh AP determining if the firmware file has already been received; and in response to a determination that the firmware file has already been received, transmitting an acknowledgement to the first wireless mesh AP.

17. The computer program product of claim 15, wherein the second wireless mesh AP has only a wireless communication link with the wireless mesh network.

* * * * *